(12) United States Patent
Barbee et al.

(10) Patent No.: US 6,486,252 B1
(45) Date of Patent: *Nov. 26, 2002

(54) NANOCOMPOSITES FOR HIGH BARRIER APPLICATIONS

(75) Inventors: Robert Boyd Barbee, Kingsport, TN (US); James Christopher Matayabas, Jr., Kingsport, TN (US); Jack Wesley Trexler, Jr., Kingsport, TN (US); Rodney Layne Piner, Kingsport, TN (US); John Walker Gilmer, Kingsport, TN (US); Gary Wayne Connell, Church Hill, TN (US); Jeffrey Todd Owens, Kingsport, TN (US); Sam Richard Turner, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/338,222
(22) Filed: Jun. 22, 1999

Related U.S. Application Data

(63) Continuation-in-part of application No. 08/995,178, filed on Dec. 22, 1997, now Pat. No. 6,034,163.

(51) Int. Cl.$^7$ .............................. C08J 5/10; C08K 3/34; C08L 31/00
(52) U.S. Cl. ........................ 524/445; 524/447; 524/448; 524/450; 524/451; 523/216
(58) Field of Search ................. 523/200, 216; 524/445, 447, 448, 450, 451, 789, 791, 714, 718, 736, 739, 879; 423/700, 712; 252/315.2

(56) References Cited

U.S. PATENT DOCUMENTS

| | | |
|---|---|---|
| 2,531,427 A | 11/1950 | Hauser ........................ 260/448 |
| 2,737,517 A | 3/1956 | Boyd |
| 2,924,609 A | 2/1960 | Joyce |

(List continued on next page.)

FOREIGN PATENT DOCUMENTS

| | | |
|---|---|---|
| DE | 3806548 | 9/1988 |
| DE | 3808623 | 10/1988 |
| EP | 186456 | 7/1986 |

(List continued on next page.)

OTHER PUBLICATIONS

LeBaron et al., "Polymer–layered silicate nanocomposites: an overview," *App. Clay Sci.*, 15, 11–29 (1999).

Ke et al., "Crystallization, Properties, and Crystal and Nanoscale Morphology of PET–Clay Nanocomposites," *J. Appl. Polym. Sci.*, 71, 1139–1146 (1999).

(List continued on next page.)

*Primary Examiner*—James J. Seidleck
*Assistant Examiner*—U. K. Rajguru
(74) *Attorney, Agent, or Firm*—Bernard J. Graves, Jr.

(57) ABSTRACT

The present invention relates to a composition comprising (i) a layered clay material that has been cation-exchanged with an organic cation salt represented by Formula (I):

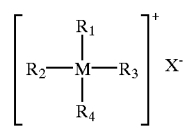

(I)

wherein M is nitrogen or phosphorous, $X^-$ is a halide, hydroxide, or acetate anion, $R_1$ is a straight or branched alkyl group having at least 8 carbon atoms, and $R_2$, $R_3$, and $R_4$ are independently hydrogen or a straight or branched alkyl group having 1 to 22 carbon atoms; and (ii) at least one expanding agent, wherein the cation-exchanged clay material contains platelet particles and the expanding agent separates the platelet particles. The present invention also relates to a composite comprising a polymer having dispersed therein a composition of this invention. Preferred polymers for use in the composite include polyesters. The composite of the present invention shows vastly improved platelet separation as evidenced by higher than previously reported basal spacing.

18 Claims, 2 Drawing Sheets

U.S. PATENT DOCUMENTS

| | | | |
|---|---|---|---|
| 2,938,914 A | 5/1960 | Joyce | |
| 2,957,010 A | 10/1960 | Straley et al. | |
| 2,966,506 A | 12/1960 | Jordan | 260/448 |
| 3,076,821 A | 2/1963 | Hoare | |
| 3,125,586 A | 3/1964 | Katz et al. | |
| 3,232,934 A | 2/1966 | Hoare | |
| 3,281,434 A | 10/1966 | Turetzky et al. | |
| 3,391,164 A | 7/1968 | Straley et al. | |
| 3,499,916 A | 3/1970 | Berthold | |
| 3,514,498 A | 5/1970 | Okazaki et al. | |
| 3,544,523 A | 12/1970 | Maxion | |
| 3,627,625 A | 12/1971 | Jarrett | |
| 3,646,072 A | 2/1972 | Shaw | |
| 3,700,398 A | 10/1972 | Cole, Jr. | |
| 3,792,969 A | 2/1974 | Gertisser | |
| 3,823,169 A | 7/1974 | Staub | |
| 3,843,479 A | 10/1974 | Matsunami et al. | |
| 3,849,406 A | 11/1974 | Basel et al. | |
| 3,876,552 A | 4/1975 | Moynihan | |
| 3,946,089 A | 3/1976 | Furukawa et al. | |
| 4,018,746 A | 4/1977 | Brinkmann et al. | |
| 4,064,112 A | 12/1977 | Rothe et al. | |
| 4,071,503 A | 1/1978 | Thomas et al. | |
| 4,081,496 A | 3/1978 | Finlayson | 260/864 |
| 4,105,578 A | 8/1978 | Finlayson | 252/316 |
| 4,116,866 A | 9/1978 | Finlayson | 252/316 |
| 4,133,802 A | 1/1979 | Hachiboshi et al. | |
| 4,161,578 A | 7/1979 | Herron | |
| 4,163,002 A | 7/1979 | Pohl et al. | |
| 4,208,218 A | 6/1980 | Finlayson | 106/287.25 |
| 4,219,527 A | 8/1980 | Edelman et al. | |
| 4,239,826 A | 12/1980 | Knott, II et al. | |
| 4,391,637 A | 7/1983 | Mardis et al. | 106/20 |
| 4,393,007 A | 7/1983 | Priester et al. | |
| 4,398,642 A | 8/1983 | Okudaria et al. | |
| 4,410,364 A * | 10/1983 | Finlayson et al. | 106/20 |
| 4,412,018 A | 10/1983 | Finlayson et al. | 523/508 |
| 4,429,079 A | 1/1984 | Shibata et al. | |
| 4,434,075 A | 2/1984 | Mardis et al. | 252/315.2 |
| 4,434,076 A | 2/1984 | Mardis et al. | 252/315.2 |
| 4,442,163 A | 4/1984 | Kühner et al. | |
| 4,450,095 A | 5/1984 | Finlayson | 252/315.2 |
| 4,472,538 A | 9/1984 | Kamigaito et al. | |
| 4,482,695 A | 11/1984 | Barbee et al. | |
| 4,517,112 A | 5/1985 | Mardis et al. | 252/315.2 |
| 4,536,425 A | 8/1985 | Hekal | |
| 4,546,126 A | 10/1985 | Breitenfellner et al. | |
| 4,595,715 A | 6/1986 | Kuze et al. | |
| 4,600,409 A | 7/1986 | Campbell | |
| 4,646,925 A | 3/1987 | Nohara | |
| 4,676,929 A | 6/1987 | Rittler | |
| 4,677,158 A | 6/1987 | Tso et al. | 524/789 |
| 4,680,208 A | 7/1987 | Aoki et al. | |
| 4,720,420 A | 1/1988 | Crass et al. | |
| 4,725,466 A | 2/1988 | Crass et al. | |
| 4,739,007 A | 4/1988 | Okada et al. | 524/789 |
| 4,742,098 A | 5/1988 | Finlayson et al. | |
| 4,769,078 A | 9/1988 | Tso | 106/287.25 |
| 4,777,206 A | 10/1988 | Rittler | |
| 4,810,734 A * | 3/1989 | Kawasumi et al. | 523/216 |
| 4,889,885 A | 12/1989 | Usuki et al. | |
| 4,894,411 A | 1/1990 | Okada et al. | |
| 4,946,365 A | 8/1990 | Kudert et al. | |
| 4,957,980 A | 9/1990 | Kobayashi et al. | |
| 4,983,432 A | 1/1991 | Bissot | |
| 4,983,719 A | 1/1991 | Fox et al. | |
| 4,994,313 A | 2/1991 | Shimizu et al. | |
| 5,028,462 A | 7/1991 | Matlack et al. | |
| 5,034,252 A | 7/1991 | Nilsson et al. | |
| 5,037,285 A | 8/1991 | Kudert et al. | |
| 5,091,462 A | 2/1992 | Fukui et al. | |
| 5,102,948 A | 4/1992 | Deguchi et al. | |
| 5,110,501 A | 5/1992 | Knudson, Jr. et al. | 252/315.2 |
| 5,149,485 A | 9/1992 | Belcher | |
| 5,153,061 A | 10/1992 | Cavagna et al. | |
| 5,153,062 A | 10/1992 | Grolig et al. | |
| 5,164,440 A | 11/1992 | Deguchi et al. | |
| 5,164,460 A | 11/1992 | Yano et al. | 524/445 |
| 5,206,284 A | 4/1993 | Fukui et al. | |
| 5,221,507 A | 6/1993 | Beck et al. | |
| 5,248,720 A | 9/1993 | Deguchi et al. | |
| 5,273,706 A | 12/1993 | Laughner | |
| 5,314,987 A | 5/1994 | Kim et al. | |
| 5,334,241 A | 8/1994 | Jordan | 106/487 |
| 5,336,647 A | 8/1994 | Naë et al. | 501/146 |
| 5,340,884 A | 8/1994 | Mills et al. | |
| 5,374,306 A | 12/1994 | Schlegel et al. | |
| 5,382,650 A | 1/1995 | Kasowski et al. | |
| 5,385,776 A | 1/1995 | Maxfield et al. | |
| 5,414,042 A | 5/1995 | Yasue et al. | |
| 5,429,999 A | 7/1995 | Naë et al. | 501/146 |
| 5,434,000 A | 7/1995 | Konagaya et al. | |
| 5,514,734 A | 5/1996 | Maxfield et al. | |
| 5,523,045 A | 6/1996 | Kudert et al. | |
| 5,530,052 A | 6/1996 | Takekoshi et al. | |
| 5,552,469 A | 9/1996 | Beall et al. | |
| 5,578,672 A | 11/1996 | Beall et al. | |
| 5,612,138 A | 3/1997 | Kurz et al. | |
| 5,620,774 A | 4/1997 | Etchu et al. | |
| 5,648,159 A | 7/1997 | Sato | |
| 5,660,761 A | 8/1997 | Katsumoto et al. | |
| 5,665,454 A | 9/1997 | Hosoi et al. | |
| 5,728,764 A | 3/1998 | Bauer et al. | |
| 5,747,560 A | 5/1998 | Christiani et al. | 523/209 |
| 5,780,376 A | 7/1998 | Gonzales et al. | |
| 5,807,630 A | 9/1998 | Christie et al. | |
| 5,830,544 A | 11/1998 | Kerscher et al. | |
| 5,849,830 A | 12/1998 | Tipursky et al. | |
| 5,882,751 A | 3/1999 | Occhiello et al. | |
| 5,942,320 A | 8/1999 | Miyake et al. | |
| 5,952,093 A | 9/1999 | Nichols et al. | |
| 5,993,769 A | 11/1999 | Pinnavaia et al. | |
| 6,017,632 A | 1/2000 | Pinnavaia et al. | |
| 6,034,163 A | 3/2000 | Barbee et al. | |
| 6,036,765 A | 3/2000 | Farrow et al. | |
| 6,050,509 A | 4/2000 | Clarey et al. | |
| 6,057,396 A | 5/2000 | Lan et al. | |
| 6,060,549 A | 5/2000 | Li et al. | |
| 6,071,988 A | 6/2000 | Barbee et al. | |
| 6,084,019 A | 7/2000 | Matayabas, Jr. et al. | |
| 6,117,541 A | 9/2000 | Frisk | |
| 6,120,860 A | 9/2000 | Bowen et al. | |
| 6,162,857 A | 12/2000 | Trexler et al. | |
| 6,232,388 B1 | 5/2001 | Lan et al. | |

FOREIGN PATENT DOCUMENTS

| | | |
|---|---|---|
| EP | 0202532 | 11/1986 |
| EP | 261430 | 3/1988 |
| EP | 278403 | 8/1988 |
| EP | 295336 | 12/1988 |
| EP | 398551 | 11/1990 |
| EP | 459472 | 12/1991 |
| EP | 542266 | 5/1993 |
| EP | 0590263 | 4/1994 |
| EP | 650994 | 5/1995 |
| EP | 0691212 | 1/1996 |
| EP | 0691376 | 1/1996 |
| EP | 681990 | 11/1996 |
| EP | 747451 | 12/1996 |
| EP | 0761739 | 3/1997 |
| EP | 780340 | 6/1997 |

| | | |
|---|---|---|
| EP | 0822163 | 2/1998 |
| EP | 0846723 | 6/1998 |
| EP | 0 899 301 A1 | 3/1999 |
| EP | 0909787 | 4/1999 |
| EP | 0 909 787 A1 | 4/1999 |
| EP | 940430 | 9/1999 |
| GB | 1090036 | 11/1967 |
| GB | 2123014 | 1/1984 |
| JP | 75001156 | 1/1975 |
| JP | 75005735 | 3/1975 |
| JP | 75005751 | 3/1975 |
| JP | 75010196 | 4/1975 |
| JP | 76029697 | 3/1976 |
| JP | 62073943 | 4/1987 |
| JP | 7026123 | 1/1995 |
| JP | 09048908 | 2/1997 |
| JP | 9176461 | 7/1997 |
| JP | 9217012 | 8/1997 |
| JP | 10001608 | 1/1998 |
| JP | 10077427 | 3/1998 |
| JP | 10133013 | 5/1998 |
| JP | 10168305 | 6/1998 |
| WO | WO 84/03096 | 8/1984 |
| WO | WO 93/04117 | 3/1993 |
| WO | WO 93/04125 | 3/1993 |
| WO | WO 93/04118 | 4/1993 |
| WO | WO 93/11190 | 6/1993 |
| WO | WO 93/14922 | 8/1993 |
| WO | WO 94/11430 | 5/1994 |
| WO | WO 94/29378 | 12/1994 |
| WO | WO 95/06090 | 3/1995 |
| WO | WO 95/14733 | 6/1995 |
| WO | WO 96/08526 | 3/1996 |
| WO | WO 96/25458 | 8/1996 |
| WO | WO 97/17398 | 5/1997 |
| WO | WO 97/30950 | 8/1997 |
| WO | WO 97/31057 | 8/1997 |
| WO | WO 97/31973 | 9/1997 |
| WO | WO 97/44384 | 11/1997 |
| WO | WO 98/01346 | 1/1998 |
| WO | WO 98/29499 | 7/1998 |
| WO | WO 98/53000 | 11/1998 |
| WO | WO 99/02593 | 1/1999 |
| WO | WO 99/15432 | 4/1999 |
| WO | WO 99/41299 | 8/1999 |
| WO | WO 0034378 | 6/2000 |
| WO | WO 0034393 | 6/2000 |

OTHER PUBLICATIONS

Giannelis, "Polymer Layered Silicate Nanocomposites," *Advanced Materials*, 8, 29–35 (1996).

Oriakhi et al., "Incorporation of poly(acrylic acid), poly(vinylsulfonate) and poly(styrenesulfonate) within layered double hydroxides," *J. Mater. Chem.*, 6, 103–107 (1996).

Messersmith et al., "Syntheses and Barrier Properties of Poly(ε–Caprolactone)–Layered Silicate Nanocomposites," *J. of Polym. Sci.*, 33, 1047–1057 (1995).

Sugahara et al., "Clay–Organic Nano–Composite; Preparation of a Kaolinite—Poly(vinylpyrrolidone) intercalation Compound," *J. Ceramic Society of Japan*, 100, 413–416 (1992).

Yano et al., "Synthesis and properties of polyimide–clay hybrid," *ACS, Polymer Preprints*, 32, 65–66, (1991).

Fukushima et al., "Swelling Behavior of Montmorillonite by Poly–6–Amide," *Clay Minerals*, 23, 27–34 (1988).

Verbicky, *Encyclopedia of Polymer Science and Engineering*, 2nd Edition, 12, 364–383 (1988).

Fukushima et al., "Synthesis of an Intercalated Compound of Montmorillonite and 6–Polyamide," *J. Inclusion Phenomena*, 5, 473–482, (1987).

Okada et al., "Synthesis and Characterization of a Nylon 6–Clay Hybrid," *ACS, Polymer Preprints*, 28, 447–448, (1987).

Fahn et al., "Reaction Products of Organic Dye Molecules with Acid–Treated Montmorillonite," *Clay Minerals*, 18, 447–458 (1983).

Greenland, "Adsorption of Polyvinyl Alcohols by Montmorillonite," *J. Colloid Sci.*, 18, 647–664 (1963).

T.J. Pinnavaia and Tie Lan, "*Clay–Reinforced Epoxy Nanocomposites,*"*Chem. Mater* 6, 2216 (1994).

Y. Kurokawa, H. Yasuda, A. Oya, "*Preparation of a Nancomposite of Polypropylene and Smectite,*"*Mater. Sci. Letters*, 15, 1481 (1996).

M. Kawasumi, N. Hasegawa, M. Kato, A Usuki, and A. Okada, , "Preparation and Mechanical Properties of Polyproplene–Clay Hybrids", *Macromolecules*, 30, 6333 (1997).

A. Usuki, M. Kato, A. Okada, T. Kurauchi,"Synthesis of Propylene–Clay Hybrid", *J. Appl. Polym.* Sci. 63, 137 (1997).

* cited by examiner

NANOCOMPOSITES FOR HIGH BARRIER APPLICATIONS

RELATED APPLICATION

This application is a continuation-in-part of patent application U.S. Ser. No. 08/995,178, filed Dec. 22, 1997 now U.S. Pat. No. 6,034,163, which is herein incorporated in its entirety by this reference.

BACKGROUND OF THE INVENTION

Field of the Invention

This invention relates generally to a polymer composite material having improved barrier properties. More particularly, the polymer composite material of this invention is useful for forming packages or containers that have improved gas barrier properties. Containers made from this polymer composite material are ideally suited for protecting consumable products, such as foodstuffs, carbonated drinks, fruit juices, medicines and the like.

RELATED REFERENCES

A. Usuki, M. Kato, A. Okada, T. Kurauchi, J. Appl. Polym. Sci. 63, 137(1997) describes a polypropylene composite that is made by melt mixing polypropylene with an organoclay that has been expanded with a polyolefin oligomer.

Y. Kurokawa, H. Yasuda, A. Oya, J. Mater. Sci Letters. 15, 1481 (1996) describes a polypropylene composite that is made by copolymerizing diacetone acrylamide and maleic acid modified-polypropylene in the presence of an organoclay and melt mixing with polypropylene.

T. J. Pinnavaia and Tie Lan, Chem. Mater. 6, 2216 (1994) describes oganoclays that have been expanded with epoxy resin monomers.

M. Kawasumi, N. Hasegawa, M. Kato, A. Usuki, and A. Okada, Macromolecules, 30, 6333 (1997) describes a polypropylene composite that is made by melt-mixing polypropylene, maleic anhydride modified polypropylene oligomers.

U.S. Pat. Nos. 4,739,007 and 5,164,460 disclose polyamide composite materials containing a layered clay mineral intercalated with organic onium salts.

WO 93/04118 relates to a process for forming polymeric composites which are comprised of platelet particles containing organic onium salts dispersed in a polymeric matrix.

U.S. Pat. Nos. 5,336,647 and 5,429,999 describe the preparation of layered clays containing polyalkoxylated ammonium salts. Use of these clays in polyesters, however, is not disclosed.

Among the numerous patents that describe the preparation of layered clays containing ammonium salts are U.S. Pat. Nos. 2,531,427; 2,966,506; 4,081,496; 4,105,578; 4,116,866; 4,208,218; 4,391,637; 4,410,364; 4,412,018; 4,434,075; 4,434,076; 4,450,095; 4,517,112; 4,677,158; 4,769,078; 5,110,501; and 5,334,241.

Polymers such as poly(ethylene terephthalate)(PET) are widely used in bottles and containers which are used for carbonated beverages, fruit juices, and certain foods. However, because of the limited barrier properties to oxygen, carbon dioxide and the like, PET containers, for example, are not generally used for products requiring long shelf life. It would be desirable, therefore, to provide improved gas barrier properties in polymer containers.

SUMMARY OF THE INVENTION

The present invention generally relates to a composite material comprising a polymer having dispersed therein at least one layered clay material that has been cation-exchanged with an organic cation salt. The composite material provides improved gas barrier properties in containers or bottles produced therefrom.

In accordance with the purpose(s) of this invention, as embodied and broadly described herein, this invention, in one aspect, relates to a composition comprising (i) a layered clay material that has been cation-exchanged with an organic cation salt represented by the formula (I):

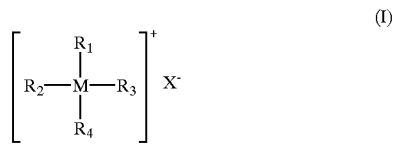

(I)

wherein M is nitrogen or phosphorous, $X^-$ is a halide, hydroxide, or acetate anion, $R_1$ is a straight or branched alkyl group having at least 8 carbon atoms, and $R_2$, $R_3$, and $R_4$ are independently hydrogen or a straight or branched alkyl group having 1 to 22 carbon atoms; and (ii) at least one expanding agent, wherein the cation-exchanged clay material contains platelet particles and the expanding agent separates the platelet particles.

In another aspect, the present invention relates to a composite comprising a polymer having dispersed therein (i) at least one layered clay material that has been cation-exchanged with an organic cation salt having at least one straight or branched alkyl group having at least 8 carbon atoms; and (ii) at least one expanding agent that is compatible with the polymer, wherein the cation-exchanged clay material contains platelet particles and the expanding agent separates the platelet particles, and wherein the platelet particles are dispersed in the polymer such that the basal spacing between the platelet particles is greater than about 3 nm.

In yet another aspect, the present invention relates to a composite comprising a polymer having dispersed therein (i) a layered clay material that has been cation-exchanged with an organic cation salt represented by Formula (I):

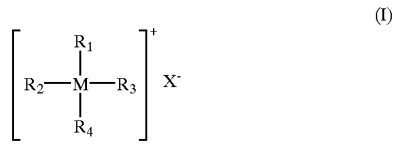

(I)

wherein M is nitrogen or phosphorous, $X^-$ is a halide, hydroxide, or acetate anion, $R_1$ is a straight or branched alkyl group having at least 8 carbon atoms, and $R_2$, $R_3$, and $R_4$ are independently hydrogen or a straight or branched alkyl group having 1 to 22 carbon atoms; and (ii) at least one expanding agent that is compatible with the polymer, wherein the cation-exchanged clay material contains platelet particles and the expanding agent separates the platelet particles.

Additional advantages of the invention will be set forth in part in the detailed description, including the figures, which follow, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

Figure 1:
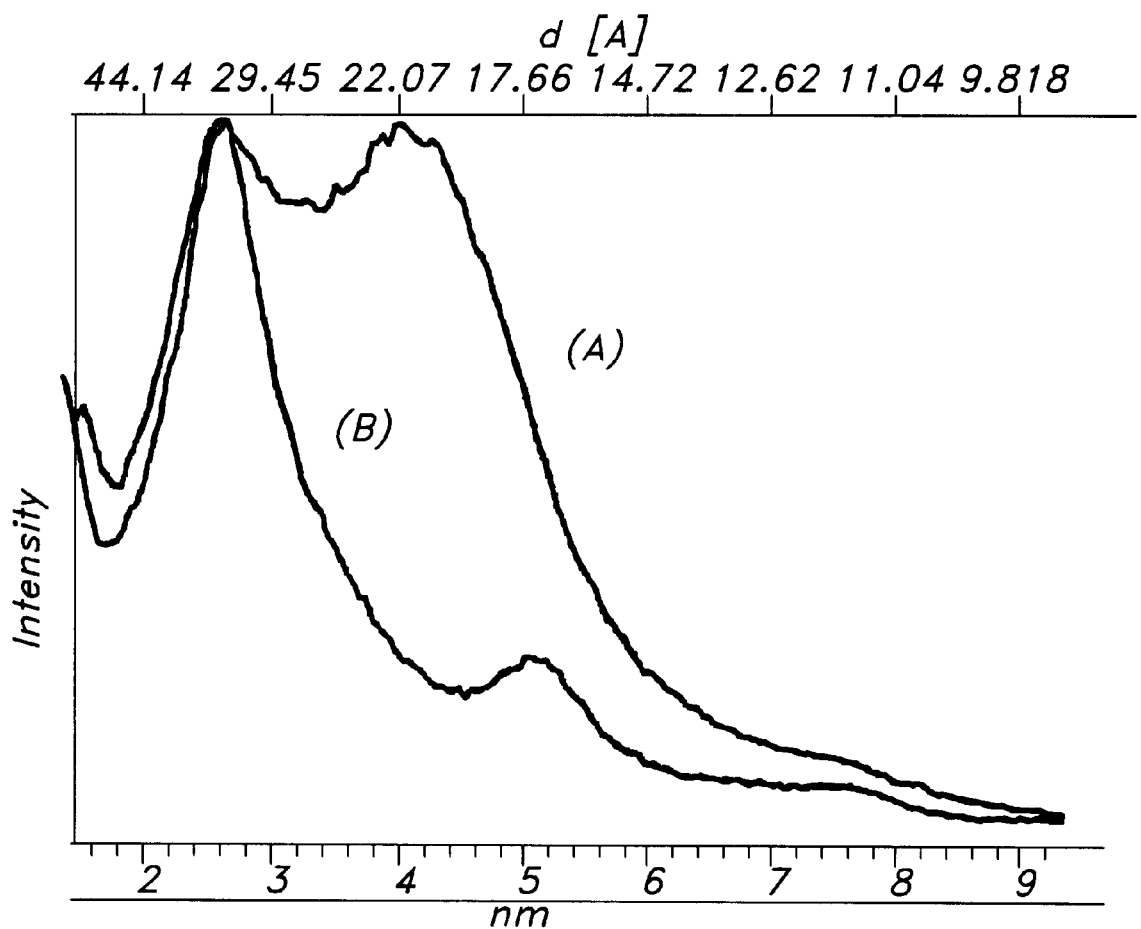
FIG. 1 is a plot of X-ray diffraction patterns of tallow methyl dihydroxyethylammonium montmorillonite expanded with PETG 6763 and containing (A) 60% clay and (B) 40% clay. X-ray reflections at 3.2 and 2.2 nm correspond to the fully expanded organoclay and partially expanded organoclay, respectively.

The present invention may be understood more readily by reference to the following detailed description of the invention, including the appended figures referred to herein, and the examples provided therein. It is to be understood that this invention is not limited to the specific processes and conditions described, as specific processes and/or process conditions for processing plastic articles as such may, of course, vary. It is also to be understood that the terminology used herein is for the purpose of describing particular embodiments only and is not intended to be limiting.

It must also be noted that, as used in the specification and the appended claims, the singular forms "a," "an" and "the" include plural referents unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Presently Preferred Embodiments

This invention generally relates to 1) a composition for use with a polymer composite and 2) a polymer composite material comprising a polymer and a pre-swelled layered organoclay material.

Specifically, in a preferred embodiment, the present invention relates to a polyester composite comprising at least one polyester having dispersed therein up to about 30 weight percent of an expanded organoclay comprising (a) 20 to 80 weight percent of a swellable layered silicate clay such as montmorillonite that has been cation-exchanged with an onium salt having one substituent selected from the group consisting of straight and branched alkyl groups having at least 8 carbon atoms; and (b) 80 to 20 weight percent of at least one expanding agent.

Although some enhancement of barrier of a polyester occurs by incorporation of an organoclay itself, it was found unexpectedly that a greater improvement in barrier occurred when the organoclay was pre-swelled with an expanding agent.

Without being bound by any particular theory, it is believed that the interlayer spacing of the clay increases due to the expanding agent, and as a result, the interaction of the platelet particle layers are weakened to provide improved dispersion in the polyester.

An organoclay is defined as a swellable layered clay material that has been ion exchanged with an onium ion. An expanding agent is defined herein as any material that will increase the basal spacing of an organoclay when introduced into the galleries. An expanded organoclay is defined herein as an organoclay that has been pre-swelled with an expanding agent.

These novel polyester composites containing the expanded organoclay exhibit lower oxygen permeability than the polyester or the polyester organoclay blend alone. The improvement in oxygen permeability is clearly apparent in the comparison of film prepared from (1) unmodified poly(ethylene terephthalate), (2) a poly(ethylene terephthalate)-platelet particle composite containing 2.9 wt. % of bis(2-hydroxyethyl) methyl tallow ammonium montmorillonite and (3) a poly(ethylene terephthalate)-platelet particle composite containing 2.9 wt. % of bis(2-hydroxyethyl) methyl tallow ammonium montmorillonite and pre-swelled with the expanding agent poly(ethylene oxide) with a molecular weight of 3350 g/mol. The oxygen permeabilities of (1), (2), and (3) are 12, 11, and 6 cc-mil/100 in$^2$-24 hours-atm, respectively. These examples and other examples demonstrating this invention are shown in Table 1.

Organoclay Materials

The compositions of the present invention preferably comprise from about 0.01 to about 20 wt %, more preferably from about 0.5 to 10 wt %, and even more preferably from about 2.0 to 5 wt % of at least one certain expanded organoclay which is derived from organic and inorganic clay materials. The amount of expanded organoclay is determined by measuring the amount of ash of the polyester-platelet compositions when treated in accordance with ASTM D5630-94, which is incorporated herein by reference.

The platelet particles of the present invention preferably have a thickness of less than about 2 nm and a diameter in the range of about 1 to about 1000 nm. For the purposes of this invention, measurements refer only to the platelet particle and not any dispersing aids or pretreatment compounds which might be used. Suitable platelet particles are derived from clay materials which are free flowing powders having a cation-exchange capacity between about 0.3 and about 3 meq/g and preferably between about 0.8 and about 1.5 meq/g. Examples of suitable clay materials include mica-type layered phyllosilicates, including clays, smectite clays, sodium montmorillonite, sodium hectorite, bentonite montronite, beidellite, volkonskoite, saponite, sauconite, magadiite, vermiculite, mica, kenyaite, and the like. Further, any synthetic clay material corresponding to the naturally occurring clays mentioned above may also be used to derive the platelet particles, e.g., LAPONITE (synthetic sodium hectorite) from Southern Clay Products. Clay materials useful for this invention are commercially available from various companies including Southern Clay Products and Nanocor, Inc. Generally, the clay materials are a dense agglomeration of platelet particles which are closely stacked together like cards.

Preferred swellable layered clay materials are phyllosilicates of the 2:1 type having a cation-exchange capacity of 50 to 200 milliequivalents per 100 grams of mineral. The most preferred swellable layered clay materials are smectite clay minerals, specifically montmorillonite.

Other non-clay materials having the above-described ion exchange capacity and size, such as chalcogens may also be used as the source of platelet particles under the present invention. These materials are known in the art and need not be described in detail here.

Dispersions of platelet particles having large basal spacing (greater than about 3 nm) have not been previously disclosed. Previous patents and applications have claimed to produce polyesters containing intercalated or exfoliated platelet particles, as indicated by large basal spacings or the lack of a detectable basal spacing by X-ray, however, the results could not be reproduced, particularly in polyesters.

Cation-Exchange Materials

Useful organic cation salts for the process of this invention may be represented by Formula I:

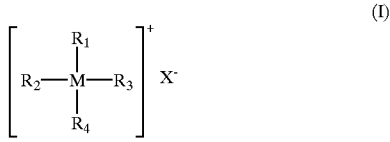

(I)

wherein M is nitrogen or phosphorous, $X^-$ is a halide, hydroxide, or acetate anion, preferably a chloride or bromide ion, $R_1$ is a straight or branched alkyl group having at least 8 carbon atoms, preferably from 8 to 25 carbon atoms, and more preferably from 12 to 20 carbon atoms, and $R_2$, $R_3$, and $R_4$ are independently selected from organic and oligomeric ligands or may be hydrogen. Preferably, $X^-$ is a chloride or bromide ion.

Examples of useful organic ligands include, but are not limited to, linear or branched alkyl groups having 1 to 22 carbon atoms, aralkyl groups which are benzyl and substituted benzyl moieties including fused ring moieties having linear chains or branches of 1 to 22 carbon atoms in the alkyl portion of the structure, aryl groups such as phenyl and substituted phenyl including fused ring aromatic substituents, beta, gamma unsaturated groups having six or less carbon atoms, and alkyleneoxide groups having 2 to 6 carbon atoms. Examples of useful oligomeric ligands include, but are not limited to, poly(alkylene oxide), polystyrene, polyacrylate, polycaprolactone and the like.

Preferably, $R_2$, $R_3$, and $R_4$ are independently straight or branched alkyl groups having 1 to 12 carbon atoms, and more preferably, 1 to 4 carbon atoms. Even more preferably, at least one of $R_2$, $R_3$, and $R_4$ are methyl.

Examples of useful onium ions includes alkyl ammonium ions, such as dodecyl ammonium, octadecyl ammonium, and bis(2-hydroxyethyl)octadecyl methyl ammonium, and the like, and alkyl phosphonium ions, such as octadecyltriphenyl phosphonium.

According to the process of the present invention, the selected cation-exchanged clay material is treated with at least one expanding agent to separate the agglomerates of platelet particles to individual platelet particles and small tactoids prior to introducing the platelet particles to the polyester.

Tactoids are small aggregates of platelet particles. Separating the platelet particles also improves the polyester/platelet interface. Any treatment that achieves the above goals may be used. Examples of useful treatments include intercalation with water soluble or water insoluble polymers, organic reagents or monomers, silane compounds, metals or organometallics, organic cations to effect cation-exchange, and their combinations.

The process for manufacturing the polyester composite material of this invention comprises (1) preparing the organoclay material, (2) pre-swelling the organoclay material with an expanding agent, and (3) incorporating the expanded organoclay in a polyester.

The first step of this invention is the preparation of the organoclay material by the reaction of a swellable layered clay with an onium ion. The organoclay material of this invention may be prepared by dispersing the clay in hot water, most preferably from 50 to 80° C., adding the onium ion with agitation, then blending for a period of time sufficient for the onium compound to exchange most of the cations, usually sodium ions, associated with the layers of the clay. It is desirable to use a sufficient amount of the onium ions to exchange most of the cations present in the galleries. The organoclay material is isolated by methods known in the art, such as filtration or centrifugation.

The second step of this invention is to pre-swell the organoclay with an expanding agent. Although several methods are available to incorporate the expanding agent within the organoclay, such as melt mixing of the expanding agent and organoclay, spray drying of a mixture of the expanding agent and organoclay, or preparation of the organoclay in the presence of the expanding agent, the most expedient method for this invention is to dissolve or suspend both the expanding agent and organoclay in a solvent, such as methylene chloride, then evaporate off the solvent to provide the expanded organoclay.

The third step of this invention is to incorporate the expanded organoclay material into a melt-processible polyester. This process is directed toward preparation of polyester composites wherein the dispersed phase is preferably comprised of individual layers of the layered clay material or tactoids of less than about ten layers having a basal spacing greater than about 30 angstroms (Å). The intercalated clay mineral component of the composition of this invention is preferably present in amounts up to 30 weight percent, more preferably up to about 15 weight percent. The polyester component of the compound of the present invention is preferably present in amounts of at least about 70 weight percent, more preferably at least 85 weight percent.

One method of incorporating the expanded organoclay into a polyester is the polycondensation of monomers to the polyester in the presence of the expanded organoclay material. The polyester in the present invention may be produced using well known polycondensation procedures. The polyester composite prepared in this manner may also be treated with solid state polymerization to attain sufficient inherent viscosity (I.V.) to permit melt processing.

Another method of incorporating the organoclay material is by melt extruding a blend of the expanded organoclay and a melt-processible polyester. Conventional polymer and additive blending techniques are used in which the polymer is heated to a temperature sufficient to form a polymer melt and the desired amount of the expanded organoclay is added in a suitable mixer, for example an extruder, a Banbury Mixer, and the like. The process should subject the mixture with sufficient shear to delaminate at least 90% by weight of the intercalated material into individual layers. The polyester composite prepared in this manner may also be treated with solid state polymerization to attain sufficient I.V. to permit melt processing.

In the expansion of organoclays from a solvent, it is preferred that the expanding agent be present in an amount sufficient to provide a fully expanded organoclay. Referring particularly to the figures, FIG. 1 shows X-ray diffraction patterns of the organoclay, tallow methyl dihydroxyethylammonium montmorillonite, that has been expanded in methylene chloride with PETG 6763, commercially available from Eastman Chemical Company, as an expanding agent to provide expanded organoclays containing 40 and 60 weight percent of clay. Two X-ray reflections are evident, one at about 3.2 nm corresponding to the fully expanded organoclay, and another at about 2.2 nm corresponding to the partially expanded organoclay. These examples show that the expanded organoclay must contain less than about 40 weight percent of clay in order to provide a predominately fully expanded organoclay. Examples of expanded organoclays from a methylene chloride solvent are shown in Table 2.

Figure 2:
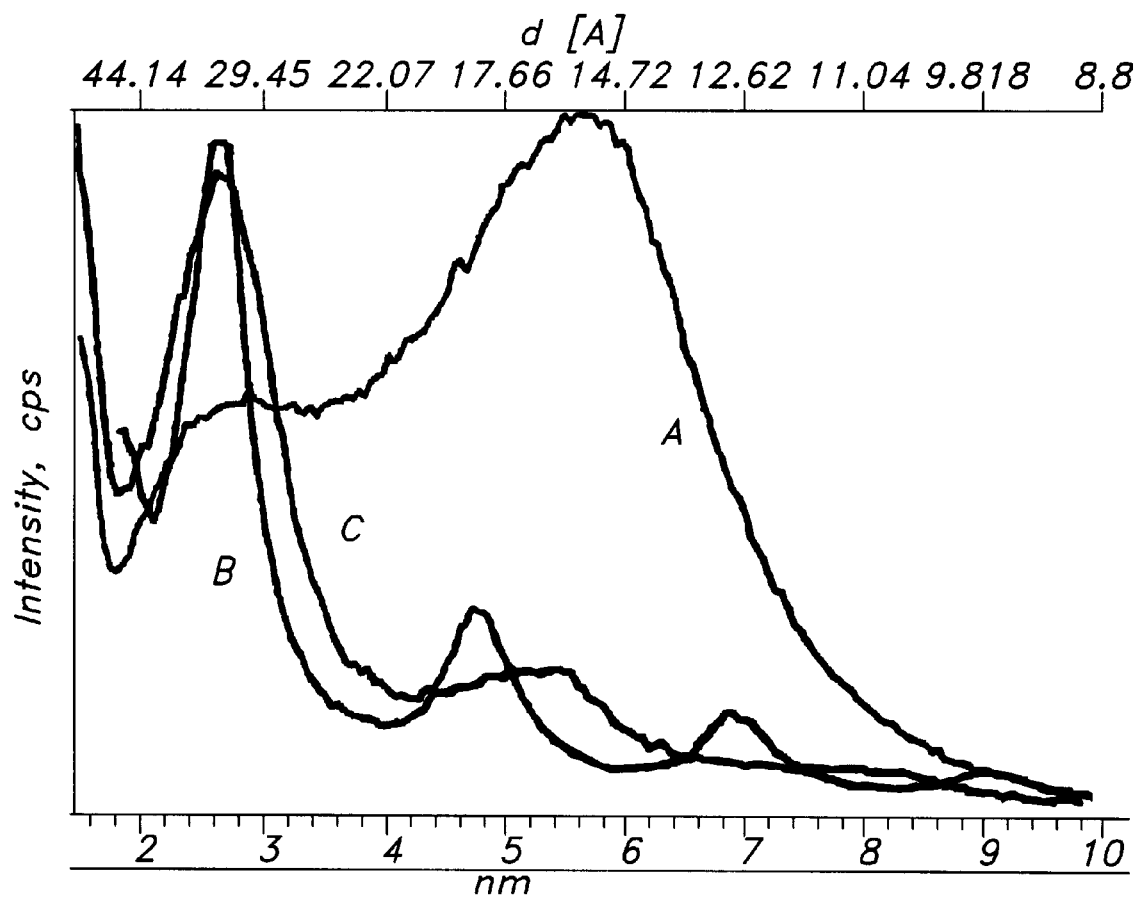
FIG. 2 is a plot of X-ray diffraction patterns of octadecyltrimethylammonium montmorillonite expanded with AQ 55 from water and containing (A) 10% clay, (B) 20% clay, and (C) 55% clay. X-ray reflections greater than 3.0 nm correspond to the fully expanded organoclay.

In the expansion of organoclays in water, a fully expanded organoclay is obtained when the clay content is more than 20% but less than 60% by weight of clay (see FIG. 2). Examples of expanded organoclays from water are shown in Table 3.

Expanding Agents

The expanding agents that are useful for this invention encompass a wide range of polymer compositions from oligomers with low molecular weight to high molecular weight polymers. Preferred oligomers or polymers are those that are compatible or miscible with a preferred polyester of this invention to ensure clarity of the final product.

When expanding from a solvent, preferred polymers are those that are soluble or will suspend readily in organic solvents such as methylene chloride or toluene. Preferred organoclays are those than can be swelled by these solvents, thus allowing easy access of the expanding agent to the interlayer spacing of the organoclay. Preferred polymers used as expanding agents should be compatible or miscible with the matrix polymer, preferably used to form the final article, if clarity is needed in the product.

Suitable expanding agents are poly(caprolactone), poly (dimethylsiloxane), polyepoxides, polystyrene, polyacrylates, polycarbonates, polyurethanes, polysufones, polyethers, polyketones, polyamides, and polyesters comprising residues from at least one dibasic acid and one glycol. In some cases in the preparation of polyesters, it may be necessary to use more than one glycol to improve miscibility of the expanding agent in organic solvents.

The primary dibasic acids are terephthalic, isophthalic, octadecyloxyisophthalic acid, naphthalenedicarboxylic, 1,4-cyclohexanedicarboxylic acid, sodiosulfoisophthalic acid and the like. Typical glycols used in the poly esters include those containing 2 to about 10 carbon atoms. Preferred glycols include ethylene glycol, diethylene glycol, 1,4-butanediol, 1,3-propanedimethanol, and 1,4-cyclohexanedimethanol. Molecular weights of these polymers can range from 250 to 25,000. Monomeric species may also act as expanding agents. Among these are Zonyl A and vitamin E.

For convenience in this work, the expanded organoclay was coated on the surface of the polyester pellets prior to extrusion. This was accomplished by blending polyester pellets with the expanded organoclay in methylene chloride followed by evaporation of the methylene chloride.

Polymers

The treated organoclay of the present invention may be combined with a wide variety of polymers including thermoplastic polymers and mixtures thereof and vulcanized and thermoplastic resins. Thermoplastic resins include polylactones, polyurethanes, linear long chain diols, polyether diols, polysulfones, polyether ether ketones, polyamides, polyesters, polyesteramides, poly(arylene) oxides, polyarylene sulfides, polyetherimides, vinyl polymers and their copolymers, ethylene acrylic acid copolymers, ethylene vinyl alcohol copolymers, acrylonitrile copolymers, methacrylate-styrene copolymers, ethylene-ethyl acrylate copolymers, methacrylated butadiene-styrene copolymers, polyolefins, cellulose ester plastics and the like.

Many suitable polymers are disclosed in WO 93/04118, the disclosure of which is incorporated herein by reference. Particularly suitable for incorporation of the expanded organoclays are polyesters which include at least one dibasic acid and at least one glycol. The primary dibasic acids are terephthalic, isophthalic, naphthalenedicarboxylic, 1,4-cyclohexanedicarboxylic acid, and the like. The various isomers of naphthalenedicarboxylic acid or mixtures of isomers may be used, but the 1,4-, 1,5-, 2,6- and 2,7-isomers are preferred. The 1,4-cyclohexanedicarboxylic acid may be in the form of cis, trans, or cis/trans mixtures. In addition to the acid forms, the lower alkyl ester or acid chloride forms may be also be used. The polyamides include poly(m-xylene adipamide), poly(p-xylene sebacamide), poly(2,2,2-trimethyl hexamethylene terephthalamide), poly(piperazine sebacamide), poly(p-phenylene terephthalamide), poly (metaphenylene isophthalamide) and the like. Also included are copolyamides and terpolyamides obtained by known methods.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having from 8 to 14 carbon atoms, aliphatic dicarboxylic acids preferably having from 4 to 12 carbon atoms, or cycloaliphatic dicarboxylic acids preferably having from 8 to 12 carbon atoms. Examples of suitable dicarboxylic acids include terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, diglycolic acid, 1,3-phenylenedioxy diacetic acid, and the like. Polyesters may be prepared from two or more of the above dicarboxylic acids.

The polymer may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, pyromellitic acid and other polyester forming polyacids or polyols generally known in the art.

Typical glycols used in the polyester include aliphatic glycols containing from about 2 to about 10 carbon atoms, aromatic glycols containing from about 6 to about 15 carbon atoms and cycloaliphatic glycols containing from about 7 to about 14 carbon atoms. Preferred glycols include ethylene glycol, 1,4-butanediol, 1,6-hexanediol, 1,4-cyclohexanedimethanol, diethylene glycol and the like. Resorcinol and hydroquinone are preferred aromatic glycols. The glycol may optionally be modified with up to about 50 mole percent of one or more additional diols. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2, 4), 2-methylpentanediol-(1,4), 2,2,4-trimethylpentane-diol-(1,3), 2-ethylhexanediol-(1,3), 2,2-diethylpropane-diol-(1, 3), hexanediol-(1,3), 1,4-di-(2-hydroxyethoxy)-benzene, 1,3-di-(2-hydroxyethoxy)benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like. 1,4-cyclohexanedimethanol may be used as the cis, trans or cis/trans mixtures. Polyesters may be prepared from one or more of the above diols.

Bifunctional compounds such as hydroxybenzoic acid may also be included.

The amount of expanded organoclay incorporated into the polyester may vary widely depending on the intended use of the composite. The amount of material employed, based on the clay content, is preferably from about 0.01 to 20% by weight of the mixture.

The polyester containing the homogeneously distributed layered clay can be formed into film by suitable film-forming methods, such as extrusion or pressing, or when the appropriate polyester is used, may be blown into bottles.

EXAMPLES

The following examples and experimental results are included to provide those of ordinary skill in the art with a complete disclosure and description of particular manners in which the present invention can be practiced and evaluated, and are intended to be purely exemplary of the invention and are not intended to limit the scope of what the inventors regard as their invention. Efforts have been made to ensure accuracy with respect to numbers (e.g., amounts, temperature, etc.); however, some errors and deviations may have occurred. Unless indicated otherwise, parts are parts by weight, temperature is in ° C. or is at ambient temperature, and pressure is at or near atmospheric.

Example 1

Example 1 illustrates a method for preparing the organoclay materials used in this invention. Sodium montmorillonite (10 grams, 9.5 millequivalents, clay supplied by Southern Clay Products and reported to have a cation-exchange capacity of 95 milliequivalents /100 grams) was mixed with 490 ml of water at 60° C. in a Vitamix blender to form a 2% by weight slurry of clay in water. Bis(2-hydroxyethyl) methyl tallow ammonium chloride (4.0 grams, 9.5 milliequivalents) commercially available as a 74% solution as Ethoquad T/12 was added to the Vitamix blender and the mixture was blended at high speed for one minute. The solids formed were removed by filtration on a Buchner funnel. The product was reslurried in 250 ml of water in a Vitamix blender, filtered again, and dried in an air circulating oven at 60° C. for 16 hours. The product exhibited a basal spacing by X - ray diffraction of 2.0 nanometers.

Example 2

Example 2 illustrates a method used for preparing the polyester containing the expanded organoclay materials used in this invention. The expanding agent polyethylene terephthalate modified with 30 mol % of 1,4-cyclohexanedimethanol (19.46 grams), which is commercially available as PETG 6763 from Eastman Chemical Company, was dissolved in 600 ml of methylene chloride. The organoclay bis(2-hydroxyethyl)methyl tallow ammonium montmorillonite (19.46 grams) was then added and the mixture blended at high speed in a Vitamix blender. Polyethylene terephtha late (863 grams), which is commercially available as PET 9921 from Eastman Chemical Company, was coated with the expanded organoclay by pouring the methylene chloride suspension over the pellets, followed by evaporation of the methylene chloride, and drying the coated pellets in a vacuum oven at 110° C. The coated pellets were extruded on a Leistritz Micro-18 double screw extruder at 275° C. and 200 rpm. The molten strand was quenched in chilled water and pelletized. The polyester composite had an inherent viscosity of 0.55 and a melting point of 244° C. The pellets were dried at 115° C. in a vacuum oven for about 16 hours then compression molded into 10 mil film. The film had an oxygen permeability of about 9 cc-mil/100 in$^2$-24 hr-atm.

Example 3

The procedure of Example 2 was repeated except that polyethylene terephthalate modified with 30 mol % of 1,4-cyclohexanedimethanol (39.04 grams) was dissolved in 1200 ml of methylene chloride and the solution blended with bis(2-hydroxyethyl)methyl tallow ammonium montmorillonite (52.02 grams). Polyethylene terephthalate (817 grams) was coated with this mixture and extruded and pelletized. The polyester composite had an inherent viscosity of 0.51 and a melting point of 243° C. Oxygen permeability of film compression molded from dried pellets was about 8 cc-mil/100 in$^2$-24 hr-atm.

Example 4

The procedure of Example 2 was repeated except that poly(ethylene oxide) with 3350 molecular weight (19.46 grams) was dissolved in 600 ml of methylene chloride and the solution blended with bis(2-hydroxyethyl) methyl tallow ammonium montmorillonite (25.04). Polyethylene terephthalate (863 grams) was coated with this mixture and extruded and pelletized. The polyester composite had an inherent viscosity of 0.50 and a melting point of 243° C. Oxygen permeability of film compression molded from dried pellets was about 6 cc-mil/100 in$^2$-24 hr-atm.

Example 5

The procedure of Example 2 was repeated except that polycaprolactone with 2000 molecular weight (19.46 grams) was dissolved in 600 ml of methylene chloride and the solution blended with bis(2-hydroxyethyl) methyl tallow ammonium montmorillonite (25.94 grams). Polyethylene terephthalate (863 grams) was coated with this mixture and extruded and pelletized. The polyester composite had an inherent viscosity of 0.50 and a melting point of 243° C. Oxygen permeability of film compression molded from dried pellets was about 10 cc-mil/100 in$^2$-24 hr-atm.

Example 6

The procedure of Example 2 was repeated except that polycaprolactone with 2000 molecular weight (39.04 grams) was dissolved in 1200 ml of methylene chloride and the solution blended with bis(2-hydroxyethyl) methyl tallow ammonium montmorillonite (25.94 grams). Polyethylene terephthalate (817 grams) was coated with this mixture and extruded and pelletized. The polyester composite had an inherent viscosity of 0.47 and a melting point of 245° C. Oxygen permeability of film compression molded from dried pellets was about 9.5 cc-mil/100 in$^2$-24 hr-atm.

Comparative Example 1

Pellets of PET 9921 were dried at 115° C. in a vacuum oven for about 16 hours then compression molded into 10 mil film. The film had an oxygen permeability of 12 cc-mil/100 in$^2$-24 hr-atm.

Comparative Example 2

The procedure of Example 2 was repeated except that no expanding agent was used. Bis(2-hydroxyethyl)methyl tallow ammonium montmorillonite (25.94 grams) was suspended in 600 ml of methylene chloride. Polyethylene terephthalate pellets (882 grams) were coated with this mixture and extruded and pelletized. The polyester composite had an inherent viscosity of 0.56 and a melting point of 244° C. Oxygen permeability of film compression molded from dried pellets was about 11 cc-mil/100 in$^2$-24 hr-atm.

TABLE 1

| Example | Wt. % Clay (Approx.) | Oxygen Permeability[1] |
|---|---|---|
| Comparative Example 1 | 0 | 12 |
| Comparative Example 2 | 2.9 | 11 |
| 2 | 2 | 9 |
| 3 | 4 | 8 |
| 4 | 2.9 | 6 |
| 5 | 2 | 10 |
| 6 | 4 | 9.5 |

[1]Oxygen permeability units are cc-mil/100 in$^2$ -24 hr-atm

As seen from the data contained in Table 1, the polyester composites containing the expanded organoclay exhibit lower oxygen permeability than the polyester alone (Comparative Example 1) or the polyester/organoclay blend alone (Comparative Example 2). For example, the improvement in oxygen permeability is clearly apparent in the comparison of film prepared from (1) unmodified poly (ethylene terephthalate) (Comparative Example 1), (2) a poly(ethylene terephthalate)-platelet particle composite containing 2.9 wt. % of bis(2-hydroxyethyl) methyl tallow ammonium montmorillonite (Comparative Example 2) and (3) a poly(ethylene terephthalate)-platelet particle composite containing 2.9 wt. % of bis(2-hydroxyethyl) methyl tallow ammonium montmorillonite and pre-swelled with the expanding agent poly(ethylene oxide) with a molecular weight of 3350 g/mol (Example 4). The oxygen permeabilities of (1), (2), and (3) are 12, 11, and 6 cc-mil/100 in$^2$-24 hours-atm, respectively. Significantly, the oxygen permeability of (3), which is 6 cc-mil/100 in$^2$-24 hours-atm, is much lower than that of the polyester composites not having the expanding agent.

Example 7

Example 7 illustrates the method used for preparing the expanded organoclay materials used in this invention from an organic solvent. The expanding agent polydimethylsiloxane, carbinol terminated (Petrarch Systems, Inc.) (2.26 grams), was dissolved in 60 ml of methylene chloride. The organoclay bis(2-hydroxyethyl) methyl tallow ammonium montmorillonite (2.73 grams) was then added and the mixture blended at high speed in a Ultra-turrax-T25 blender. The solvent was then allowed to evaporate to provide a solid material having a basal spacing by X-ray diffraction of 4.5 nanometers.

Examples 8–12

The compositions of Examples 8–12 are prepared according to the procedure set forth in Example 7 and are listed in Table 2. The organoclay used is bis(2-hydroxyethyl) methyl tallow ammonium montmorillonite and the weight percent of clay used in each example based on total weight of expanded organoclay is 40 weight percent. Ethoquad 18–25 is commercially available from AKZO Chemical Company. PD7610 is commercially available from Anderson Chemical Company. AQ55 and PETG 6763 are commercial available polyesters made by Eastman Chemical Company. Epon 828 is available from Shell Chemical Company. SCX800 is made by S.C. Johnson Wax, Co.

TABLE 2

| Example | Expanding Agent | X-Ray Basal Spacing (nm) |
|---|---|---|
| Comparative Example 3 | None | 2.0 |
| 7 | Polydimethyl siloxane | 4.5 |
| 8 | Polyethylene glycol distearate | 4.2 |
| 9 | Zonyl A | 3.8 |
| 10 | Polysar 101 polystyrene | 3.7 |
| 11 | Vitamin E | 3.6 |
| 12 | Ethoquad 18-25 | 3.5 |
| 13 | Polyglycidylacrylate (PD7610) | 3.4 |
| 14 | AQ55 | 3.2 |
| 15 | PETG 6763 | 3.1 |
| 16 | Epon 828 | 3.1 |
| 17 | Polycaprolactone | 3.0 |
| 18 | Polymethacrylate (SCX800B) | 3.0 |
| 19 | Poly(vinyl pyrrolidone) | 2.9 |
| 20 | Makrolon 2608 Polycarbonate | 2.9 |
| 21 | Poly(ethylene oxide) mw 3350 | 2.4 |

Example 22

Example 22 illustrates the method used for preparing the expanded organoclay materials from an aqueous medium. The water soluble polyester AQ 55 (5.0 grams) was dissolved in 250 ml of hot water in a Vitamix blender. Sodium montmorillonite (5.0 grams, 4.75 milliequivalents, clay supplied by Southern Clay Products and reported to have a cation-exchange capacity of 95 milliequivalents/100 grams) was added to the blender and blended for one minute. Bis(polyoxyethylene[5])octadecylamine (2.32 grams, 4.75 meq), commercially available as Ethomeen 18/15 from AKZO Chemical Company, was suspended in 25 ml of water and 4.88 g of 0.973 N HCl was added to form the ammonium salt which immediately dissolved. This ammonium salt solution was then added to the Vitamix blender containing the AQ55 and clay and the mixture was blended at high speed for one minute. The solids formed were removed by filtration on a Buchner funnel. The product was reslurried in 250 ml of water in a Vitamix blender, filtered again, and dried in an air circulating oven at 60° C. for 16 hours. The product exhibited a basal spacing by X-ray diffraction of 4.1 nanometers.

Examples 23–30

The compositions of Examples 23–30 are prepared according to the procedure set forth in Example 22 and are listed in Table 3. The expanding agent in each case is AQ55 and the weight percent of clay used in each example based on total weight of expanded organoclay is 40 weight percent.

TABLE 3

| Example | Onium ion used with sodium montmorillonite | Orano-clay | Expanded Organoclay |
|---|---|---|---|
| | | X-Ray Basal Spacing (nm) | |
| 22 | Poly(oxyethylene [5]) octadecylammonium | 1.8 | 4.1 |
| 23 | Octadecyltrimethylammonium | 2.0 | 3.9 |
| 24 | Dihydroxyethyloctadecyl ammonium | 1.7 | 3.8 |
| 25 | Benzyldimethyloctadecyl ammonium | 2.1 | 3.8 |
| 26 | Dihydroxyethyl methyl tallow ammonium | 1.9 | 3.6 |
| 27 | Dodecyltrimethylammonium | 1.6 | 3.2 |

TABLE 3-continued

| Example | Onium ion used with sodium montmorillonite | X-Ray Basal Spacing (nm) | |
|---|---|---|---|
| | | Orano-clay | Expanded Organoclay |
| 28 | Hexadecyltributylphosphonium | 2.2 | 3.1 |
| 29 | Octadecylammonium | 1.7 | 3.1 |
| 30 | Dodecylammonium | 1.4 | 3.0 |
| Comparative Example 4 | Tridodecylammonium chloride | 2.5 | 2.7 |
| Comparative Example 5 | Tetramethylammonium chloride | 1.4 | 1.4 |

Comparative Example 3

The procedure of Example 7 was repeated except that no expanding agent was used. The basal spacing of the product was 2.0 nanometers.

Comparative Example 4

The procedure of Example 22 was repeated except that tridodecylammonium chloride was used. The product had a basal spacing of 2.7 nanometers.

Comparative Example 5

The procedure of Example 22 was repeated except that tetramethylammonium chloride was used. The product had a basal spacing of 1.4 nanometers.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising (i) a layered clay material that has been cation-exchanged with an organic cation represented by Formula (I):

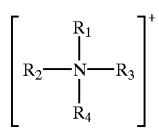

(I)

wherein (1) M is nitrogen or phosphorus, (2) $R_1$ is a straight or branched alkyl group having at least 8 carbon atoms, (3) $R_2$, $R_3$, and $R_4$ are independently selected from the group consisting of organic and oligomeric ligands and hydrogen, and (4) at least one of $R_2$, $R_3$, and $R_4$ comprises an alkylene oxide group having from 2 to 6 carbon atoms or a polyalkylene oxide group, and (ii) at least one expanding agent.

2. The composition of claim 1, wherein the cation-exchanged clay material contains platelet particles and the expanding agent separates the platelet particles.

3. The composition of claim 1, wherein $R_2$, $R_3$, and $R_4$ are not hydrogen.

4. The composition of claim 1, wherein at least one of $R_2$, $R_3$, and $R_4$ is an alkyl group having from 1 to 4 carbon atoms.

5. The composition of claim 1, wherein $R_1$ is a straight or branched alkyl group having from 8 to 25 carbon atoms.

6. The composition of claim 1, wherein the alkylene oxide group is a 2-hydroxyethyl group.

7. The composition of claim 1, wherein the organic cation is bis(2-hydroxyethyl)octadecyl methyl ammonium, or bis(2-hydroxyethyl)methyl tallow ammonium.

8. The composition of claim 1, wherein the expanding agent is an oligomer.

9. The composition of claim 1, wherein the expanding agent is a polymer having a molecular weight from about 250 to about 25,000.

10. The composition of claim 1, wherein the expanding agent is an oligomeric polyamide.

11. A composite comprising at least one polymer of a thermoplastic polymer, a mixture of thermoplastic polymers, a vulcanized resin, or a thermoplastic resin, the polymer having dispersed therein the composition of claim 1, 3, 7, 8, or 10, wherein the expanding agent is miscible with the polymer.

12. The composition of claim 11, wherein the polymer is a polyester.

13. The composition of claim 11, wherein the layered clay material is incorporated in an amount from about 0.01 to 20% by weight of the mixture.

14. The composite of claim 11, wherein the polymer is a polyamide.

15. The composition of claim 11, wherein the polymer and the expanding agent are polyamides.

16. The composite of claim 15, wherein the expanding agent is an oligomer.

17. The composition of claim 11, wherein the polymer is a copolyamide or terpolyamide.

18. The composition of claim 11, wherein the polymer is poly(m-xylene adipamide).

* * * * *